(12) United States Patent
Sakamoto et al.

(10) Patent No.: US 6,641,711 B2
(45) Date of Patent: Nov. 4, 2003

(54) ELECTRODEPOSITION COATING COMPOSITION HAVING ELECTRODEPOSITION POTENTIALITY AND PROCESS FOR ELECTRODEPOSITION COATING

(75) Inventors: Hiroyuki Sakamoto, Kobe (JP); Ichiro Kawakami, Takatsuki (JP); Koji Izumiya, Toyonaka (JP); Takao Saito, Toyonaka (JP); Masahiro Nishio, Kadoma (JP)

(73) Assignee: Nippon Paint Co., Ltd., Osaka (JP)

( * ) Notice: Subject to any disclaimer, the term of this patent is extended or adjusted under 35 U.S.C. 154(b) by 231 days.

(21) Appl. No.: 09/930,458

(22) Filed: Aug. 16, 2001

(65) Prior Publication Data

US 2002/0027077 A1 Mar. 7, 2002

Related U.S. Application Data

(63) Continuation of application No. 09/045,898, filed on Mar. 23, 1998, now abandoned, which is a continuation of application No. PCT/JP97/02539, filed on Jul. 23, 1997.

(30) Foreign Application Priority Data

Jul. 23, 1996 (JP) .............................. 8-213019
Dec. 28, 1996 (JP) .............................. 8-358111

(51) Int. Cl.⁷ ................................ C25D 5/50
(52) U.S. Cl. ................ 205/224; 205/229; 205/317; 205/320

(58) Field of Search ................. 205/224, 317, 205/320, 229; 106/1.12; 252/182.11, 182.12

(56) References Cited

U.S. PATENT DOCUMENTS 3,956,091 A * 5/1976 Stepp .................... 428/457
5,401,782 A * 3/1995 Kawakami et al. ......... 523/415
5,728,283 A * 3/1998 Reuter et al. ............. 204/499

* cited by examiner

Primary Examiner—Roy King
Assistant Examiner—Wesley A. Nicolas
(74) Attorney, Agent, or Firm—Connolly Bove Lodge & Hutz (57) ABSTRACT

An electrodeposition coating composition that is excellent in bath stability and that can give a cured film enhanced in hardness and an electrodeposition coating process is provided. An electrodeposition coating composition to be used in an electrodeposition coating process which comprises the electrodeposition step of immersing a substrate in an electrodeposition coating composition and applying a voltage between the substrate as an anode or cathode and a counter electrode to thereby form a film of said electrodeposition coating composition on the surface of the substrate, and the heating step of heating said film obtained in the above electrodeposition step, and said electrodeposition coating composition comprising having electrodeposition potentiality against the curing reaction of said film.

12 Claims, 3 Drawing Sheets

ELECTRODEPOSITION COATING COMPOSITION HAVING ELECTRODEPOSITION POTENTIALITY AND PROCESS FOR ELECTRODEPOSITION COATING

CROSS-REFERENCE TO RELATED APPLICATIONS

This is a continuation of U.S. patent application Ser. No. 09/045,898 filed Mar. 23, 1998, now abandoned, entitled Electrodeposition Coating Composition having Electrodeposition Potentiality and Process for Electrodeposition Coating, which in turn is a continuation of International Application PCT/JP97/02539, filed Jul. 23, 1997, which designates the United States.

TECHNICAL FIELD

The present invention relates to an electrodeposition coating composition that is excellent in bath stability and that can give a cured film enhanced in hardness and to an electrodeposition coating process.

BACKGROUND ART

Electrodeposition coating is a process by which even substrates complicated in form can be uniformly coated and by which coating can be conducted automatically and continuously. Therefore, it has been generally used as a method for undercoating automotive bodies and like large-sized substrates complicated in shape and required to have highly corrosion resistance. As compared with other coating processes, it is very highly efficient from the paint consumption viewpoint, hence economical. It has thus come into wide use as an industrial painting process.

The electrodeposition coating compositions currently used in such electrodeposition coating processes are generally based on isocyanate curing system. Those electrodeposition coating compositions which utilize said isocyanate curing system can give cured films having good hardness and provide excellent corrosion resistance. However, isocyanates are very highly reactive and, when used as they are, worsen bath stability. Therefore, they are generally used in the form blocked with alcohols or the like.

Meanwhile, when such blocked isocyanates are used in coating compositions, the blocking agents are released in the step of baking. They dissipate and form gum, soot or the like, contaminating the environment inside and outside heaters and drying ovens, causing deterioration of deodorizing catalysts and harming the working environment.

In addition, the isocyanates formed upon deblocking are themselves toxic, posing an environment compatibility problem. Furthermore, for forming superior coatings in the isocyanate curing system, it is necessary to raise its curing temperature. This means heavy consumption of energy in the step of baking.

To solve these problems, attempts have been made to develop electrodeposition coating compositions which can substitute for the isocyanate curing system, i.e. electrodeposition coating compositions utilizing novel curing systems, for example curing systems based on the condensation reaction of melamine or phenol resins, Michael addition polymerization curing systems, oxidative polymerization curing systems and transesterification reaction curing systems.

Like the isocyanate curing system-based ones, those electrodeposition coating compositions which have so far been proposed and in which novel curing systems are utilized invariably give, after film formation by electrodeposition, cured films by utilizing external energy, for example heat provided by baking/drying ovens, in the curing reaction.

In such systems, the main curing reaction, curing catalyst activation reaction and other reactions for producing cured films having desired characteristics can proceed when the threshold of energy required for the reactions is crossed by heating. In that case, these novel curing systems are all constituted by incorporating beforehand all elements required for constituting said curing systems into the respective coating compositions. Therefore, the curing reactions in the electrodeposition coating compositions in which these novel curing systems are utilized can be started only by heating, whether there is the step of electrodeposition or not. Thus, they are based on the so-called heat potentiality.

Therefore, the electrodeposition coating compositions utilizing said novel curing systems, which are based on the heat potentiality mentioned above, cannot avoid the progress of curing reactions in the bath as caused, for instance, by Joule's heat generated in the electrodeposition vessel upon voltage application. They are thus all poor in bath stability.

On the other hand, for improving the bath stability, it is necessary to widen the difference between bath temperature and baking temperature as far as possible and it is also necessary to raise the curing temperature itself of the electrodeposition coating composition employed so that the successive curing reactions in the bath can be inhibited. The latter means that the baking temperatures so far used give only insufficient hardness of cured films.

In particular, those electrodeposition coating compositions in which oxidative polymerization or transesterification curing systems are used have a problem in that the bath stability and curability can hardly be balanced. Therefore, it is very difficult to put to practical use the electrodeposition coating compositions in which such curing systems as mentioned above are utilized.

SUMMARY OF THE INVENTION

In view of the above-mentioned state of the art, it is a primary object of the present invention to provide an electrodeposition coating composition and an electrodeposition coating process with or by which excellent bath stability can be attained and the hardness of cured films obtained can be improved.

As a result of their intensive investigations concerning the processes of electrodeposition coating, the present inventors found that bath stability and film hardness can be made consistent when the voltage application process, which is utilized exclusively in film deposition in conventional electrodeposition coating processes, is made to be positively involved in the curing reaction of films and that reduction in curing temperature can also be readily attained. Based on such findings, the present invention has now been completed.

Thus, the present invention consists in an electrodeposition coating composition to be used in an electrodeposition coating process which comprises the electrodeposition step of immersing a substrate in an electrodeposition coating composition and applying a voltage between the substrate as an anode or cathode and a counter electrode to thereby form a film of said electrodeposition coating composition on the surface of the substrate, and the heating step of heating said film obtained in the above electrodeposition step, and said electrodeposition coating composition comprising having electrodeposition potentiality against the curing reaction of said film.

The present invention also provides an electrodeposition coating process which comprises using the above-mentioned electrodeposition coating composition.

DETAILED DISCLOSURE OF THE INVENTION

The electrodeposition coating composition of the present invention is to be used in an electrodeposition coating process which comprises the electrodeposition step of immersing a substrate in an electrodeposition coating composition and applying a voltage between the substrate as an anode or cathode and a counter electrode to thereby form a film of said electrodeposition coating composition on the surface of the substrate, and the heating step of heating said film to give a cured film.

The electrodeposition coating composition of the present invention that is used in the above-mentioned electrodeposition coating process has electrodeposition potentiality against the curing reaction of said film.

The term "electrodeposition potentiality" as used in this specification means a characteristic intrinsic in said electrodeposition coating composition and a property against the curing reaction of films and such that it is only potential and requires electrodeposition process for its expression. Thus, said property is such that, for initiating the curing reaction of films, it is essential that a voltage is applied beforehand in the electrodeposition step and an electrochemical reaction takes place; only by heating, there is no progress of the curing reaction.

As used herein, "progress of the curing reaction" means that the curing reaction actually gives cured films. Therefore, even when the curing reaction as chemical reaction has taken place, the curing reaction is not regarded as having progressed if no cured film could not have been obtained.

The above-mentioned term "electrodeposition potentiality" has been created by the present inventors and, accordingly, the concept of electrodeposition potentiality has been presented for the first time by the present inventors.

The primary factor in said electrodeposition potentiality is that, in the electrodeposition step, a chemical species activated by electrode reaction accompanying electron transfer is formed in the film simultaneously with the film formation under voltage application and said chemical species is involved in the curing reaction of the film.

Said electrodeposition potentiality is now concretely explained. The activated chemical species mentioned above is, for example, a radical, which causes curing of the film, or a radical source capable of readily generating said radical, and said chemical species occurring in the film promotes the progress of the curing reaction or the like reaction. In cases where the curing reaction of the film is initiated in the heating step, the activated state of said chemical species is retained until the heating step. Unlike conventional electrodeposition coating compositions, when the electrodeposition coating composition of the present invention is used in an electrodeposition coating process involving an electrodeposition step and a heating step, both the electrodeposition and heating steps dominate the film curing since said composition possesses the above-mentioned electrodeposition potentiality. Thus, in the electrodeposition step, an essential component for constituting a curing system is formed simultaneously with the film, whereby a complete curing system is constituted and whereby the film is prepared for the progress of the curing reaction. In the subsequent heating step, the film curing reaction proceeds owing to the curing system completed in the electrodeposition step, whereby curing can be completed. The curing reaction is initiated not only in the heating step. If the essential component for the curing system has once been formed, said reaction may of course be initiated also in the electrodeposition step.

In the electrodeposition coating composition of the present invention, the mechanism of the electrode reaction induced by voltage application in the electrodeposition step is as shown below by the formula (I) or (II). In the electrodeposition step, the electrode reaction proceeds while the functional group of the substance (substrate; "S" in the formulas) deposited on the electrode is deprived of an electron(s) or provided with an electron(s).

In the reactions represented by the above formulas (I) and (II), the activated chemical species includes the anion, cation and radical formed during the above reactions. These may singly be involved in the curing reaction or two or more may be involved to give substantially the same results. To be concrete, said anion and cation are formed as an electrolysis-generated acid and an electrolysis-generated base, respectively, which are obtained by electrochemical modification, by the electrode reaction, of a component contained in the electrodeposition coating composition of the present invention.

The reactions represented by formulas (I) and (II) can be controlled by controlling the electrode potential in the electrode reaction; therefore, a necessary amount of the activated chemical species mentioned above can be generated by adjusting said electrode potential.

The electrodeposition coating composition of the present invention can generate the chemical species activated by the electrode reaction mentioned above and it may be a cationic electrodeposition coating composition or an anionic electrodeposition coating composition.

Said electrolysis-generated base, electrolysis-generated acid, and radical include, but are not limited to, those generated upon voltage application with ammonium, sulfonium, phosphonium or a like onium group, as a supporting electrolyte. Said onium group, when it holds a hydroxide ion formed upon voltage application, becomes an electrolysis-generated base. When the counter ion to said onium group holds a hydrogen ion, said onium group becomes an electrolysis-generated acid. The electrolysis-generated base and electrolysis-generated acid occur in the film and are involved in the curing of said film. The electrolysis-generated base can be utilized in the case of cationic electrodeposition coating compositions while the electrolysis-generated acid can be utilized in the case of anionic electrodeposition coating compositions. Furthermore, the onium group mentioned above can form a radical in the neighborhood of the electrode and this radical can also be involved in the film curing.

In the electrodeposition coating composition of the present invention, a chemical species activated by the above-mentioned electrode reaction can be obtained, for example, by causing a resin component, such as the base resin or pigment-dispersing resin, to contain an onium group as a hydratable functional group, or adding a compound having an onium group as a component other than resin components.

The content of said onium group may vary according to the method for incorporating the onium group into the electrodeposition coating composition of the present invention. In the case of electrodeposition coating compositions containing the onium group as a hydratable functional group in a resin component such as the base resin or pigment-dispersing resin, however, said content is preferably 10 to 100 mmol per 100 parts by weight of the resin solids. In the case of electrodeposition coating compositions containing an onium-containing compound added thereto as a component other than the resin components, it is preferably 0.5 to 50 mmol per 100 parts by weight of the resin solids.

When the electrolysis-generated base is involved in the progress of the film curing reaction, said electrolysis-generated base can serve as a curing catalyst in the curing of the film obtained or modify a functional group of the resin in the film.

In the case of said base serving as a curing catalyst, the electrodeposition coating composition of the present invention is preferably a cationic electrodeposition coating composition having a curing system involving the Michael addition of an active methylene group to an α, β-unsaturated bond.

In said cationic electrodeposition coating composition having a curing system involving the Michael addition of an active methylene group to an α, β-unsaturated bond, the above-mentioned electrolysis-generated base serves as an activation catalyst for the addition reaction of the active methylene group to the α, β-unsaturated bond.

The onium group for forming said electrolysis-generated base has, as a counter anion, a carboxyl group or a chloride ion, for instance and, as it is, it has no catalyst activity for the Michael addition reaction. When such onium group is subjected to the electrolysis reaction at the anode for cationic electrodeposition, the weak base anion such as the carboxyl group or chloride ion is converted to a hydroxyl group, which is a strong base, and, as a result, catalytic activity is acquired. The onium group for forming an electrolysis-generated base may be one introduced into a resin component, for example the base resin, or one added in the form of an additive component.

Said base resin is not limited to any particular species provided that it has an active methylene group and an α, β-unsaturated bond. Thus, it includes acrylic resins, epoxy resins, polyester resins, urethane resins and phenol resins, among others. The method for introducing the active methylene group into said base resin is not limited to any particular one but includes, for example, such known methods as polymerization of an acrylic monomer having an active methylene group, esterification of a hydroxyl group with a compound having an active methylene group, addition to an epoxy group of a compound having an active methylene group, and acylation of an amino group. The method for introducing the α, β-unsaturated bond into said base resin is not limited to any particular one but includes, for example, such known methods as addition reaction between a compound having an α, β-unsaturated bond and the base resin, addition reaction between a carboxyl group and an epoxy group, esterification reaction between a hydroxyl group and a carboxyl group, and half esterification reaction between a hydroxyl group and an acid anhydride.

In the case of introducing the onium group into the base resin, the base resin is preferably an epoxy resin so that the onium group can easily be introduced into the resin skeleton. Said epoxy resin includes, but is not limited to, bisphenol-based epoxy resins, novolak epoxy resins, polyglycidyl ethers of aliphatic polyols or alicyclic polyols; derivatives of these as obtained by chain extension with bisphenol, bifunctional polyester polyols, bifunctional polyether polyols, etc.; epoxidized polybutadiene and homopolymers or copolymers of glycidyl (meth)acrylate, among others.

The method of onium group introduction for the formation of the electrolysis-generated base is not limited to any particular one but includes, for example, the method comprising reacting the glycidyl group occurring in a resin component, for example the base resin, with a compound capable of forming an onium group, for example a sulfide/acid mixture, and the method comprising polymerization of quaternary ammonium-containing acrylic monomers.

The sulfide to be used for forming the onium group mentioned above includes various sulfides such as aliphatic sulfides. aliphatic/aromatic mixed sulfides, aralkyl sulfides and cyclic sulfides.

In cases where a compound having an onium group is added, as a component other than resin components, to a cationic electrodeposition coating composition having the above-mentioned curing system involving the Michael addition of an active methylene group to an α, β-unsaturated bond, said compound is not limited to any particular species but includes, among others, tetraalkylammonium halides such as tetrabutylammonium bromide and tetrabutylammonium chloride.

In cases where the above-mentioned electrolysis-generated base modifies a functional group of the resin in the film, the electrodeposition coating composition is preferably a cationic electrodeposition coating composition with a propargyl/allene curing system. In the cationic electrodeposition coating composition with the propargyl/allene curing system, the propargyl group alone occurs as a reactive group before the electrodeposition is conducted. The radical reactivity of the propargyl group is low, hence the curing reaction of the propargyl group will not proceed upon heating in the heating step. The propargyl group is denatured to an allene bond by the electrolysis-generated base, which is an activated chemical species and is formed in the electrodeposition step. The radical reactivity of said allene bond is higher than that of the propargyl group, so that the curing reaction of the film composed of the cationic electrodeposition coating composition having the propargyl/allene curing system can be caused to proceed by heating in the heating step.

The base resin constituting the cationic electrodeposition coating composition having the propargyl/allene curing system is not limited to any particular species provided that it has a propargyl group in its side chain. Thus, it includes, among others, acrylic resins, epoxy resins, polybutadiene resins, polyester resins, polyamide resins and other resins generally used in electrocoating paints. The method for introducing the propargyl group is not limited to any specific one but includes, for example, the method comprising first introducing a glycidyl group into the base resin and then reacting said glycidyl group with propargyl alcohol; and the method comprising first introducing an amino group into the base resin and then reacting said amino group with a propargyl halide such as propargyl chloride or propargyl bromide.

In said cationic electrodeposition coating composition having the propargyl/allene curing system, the electrolysis-generated base serves as a catalyst for the conversion of the propargyl group to the allene bond. The onium group for forming the electrolysis-generated base may be one introduced into a resin component, such as the base resin, or one added as a further component.

The method for introducing the onium group for forming the electrolysis-generated base into the base resin is not limited to any specific one but the introduction can be carried out in the same manner as in the case of the cationic electrodeposition coating composition having the curing system involving the Michael addition of an active methylene group to an $\alpha$, $\beta$-unsaturated bond.

In cases where the electrolysis-generated acid mentioned above is involved in the curing reaction of the film, the electrodeposition coating composition of the present invention is preferably an anionic electrodeposition coating composition having an alkoxysilane curing system or an anionic electrodeposition coating composition having a melamine curing system.

The anionic electrodeposition coating composition having an alkoxysilane curing system is not limited to any particular species but includes, among others, those derived from polymerizing a vinyl monomer containing a bulky alkoxysilyl group; those consisting of an emulsion obtained by mixing and dispersing a hydrophobic resin having a bulky alkoxysilyl group in its side chain and a hydrophilic acrylic resin having a carboxyl group in its side chain.

Said bulky alkoxysilyl-containing vinyl monomer is not limited to any particular species but includes, among others, vinyltriisopropoxysilane, vinyltri-t-butoxysilane and methacryloylpropyltriisopropoxysilane. Said hydrophobic resin having a bulky alkoxysilyl group in its side chain can be obtained by polymerizing such an alkoxysilyl-containing vinyl monomer as mentioned above or copolymerizing the same with a highly hydrophobic monomer. For use in the anionic electrodeposition coating composition having an alkoxysilane curing system, a homopolymer is preferred, however.

As the hydrophilic acrylic resin having a carboxyl group in its side chain, there may be mentioned those resins obtained by copolymerizing a carboxyl-containing monomer, such as acrylic acid or methacrylic acid, and another polymerizable acrylic monomer. Preferred as said other polymerizable acrylic monomer is a hydroxyl-containing acrylic monomer.

In the anionic electrodeposition coating composition having the alkoxysilane curing system, the electrolysis-generated acid hydrolyzes the bulky alkoxysilyl group to give a silanol group and further causes condensation of the silanol group to form a siloxane bond on the film. Owing to said series of reactions, the flowability of the film is suppressed and, at the same time, partial gelation proceeds on the film obtained in the electrodeposition step and, as a result, a uniform matte film can be obtained. In the heating step, the condensation reaction of the bulky alkoxysilyl group not hydrolyzed in the electrodeposition step proceeds and the curing reaction of the film as a whole thus proceeds.

Said melamine-curing anionic electrodeposition coating composition is not limited to any particular species but includes, among others, those emulsions obtained by mixing and dispersing melamine, which is a curing agent, and a hydrophilic acrylic resin having a carboxyl group and a hydroxyl group in its side chain. In this case, melamine of the hydrophobic type is preferably used. It is generally known that said melamine undergoes curing under heating in the presence of an acid catalyst. In said curing system, it is presumable that the electrolysis-generated acid generated in the electrodeposition step serves as a curing catalyst and the curing reaction proceeds in the heating step.

As the hydrophilic acrylic resin having a carboxyl group and a hydroxyl group in its side chain, there may be mentioned those given above as examples of the hydrophilic acrylic resin having a carboxyl group in its side chain.

On the other hand, in cases where the above mentioned radical is involved in the curing reaction of the film, the electrodeposition coating composition of the present invention may be one in which the onium group is converted to a radical by the electrode reaction, for instance.

Preferred as such is a cationic electrodeposition coating composition having an allene curing system. The allene-curing cationic electrodeposition coating composition shows high radical reactivity owing to the existence of the allene bond, as mentioned above, making it possible to cause the curing reaction by heating in the heating step. Therefore, a long-term stability thereof in the electrodeposition bath cannot be much expected. In cases where a low-temperature curability is expected, it is conceivable that a radical polymerization initiator be added. In that case, however, it is considered impossible to maintain the bath stability in the presence of the radical polymerization initiator in the electrodeposition bath. Nevertheless, by introducing into the electrodeposition coating composition a compound or functional group capable of forming a radical when subjected to the electrode reaction, it is possible to construct an allene curing system which is stable in the electrodeposition bath and allows the curing reaction to proceed at low temperatures in the heating step followed by the electrodeposition step. Said radical is preferably the S radical formed by electrolytic reduction of a sulfonium group.

The allene-curing cationic electrodeposition coating composition is not limited to any particular species but includes, among others, the one derived from the above-mentioned resin having a propargyl group in the side chain by isomerization to allene using a strong base such as potassium hydroxide.

In the above-mentioned propargyl/allene-curing cationic electrodeposition coating composition in which an electrolysis-generated base is involved in the film curing reaction, too, when a sulfonium group is selected as an essential component of the onium group, the electrolysis-generated base and a radical are generated in the electrodeposition step and said electrolysis-generated base promotes the modification of the propargyl group to the allene bond, while said allene bond resulting from said modification can cause the curing reaction in the heating step in the presence of said radical. Therefore, this can constitute an example of the above-mentioned allene-curing cationic electrodeposition coating composition. The coexistence of a sulfonium group can cause the above-mentioned propargyl/allene-curing cationic electrodeposition coating composition to have good bath stability and good low-temperature curability.

Since the electrodeposition coating composition of the present invention has electrodeposition potentiality, when submitted to the electrodeposition step, it allows the electrode reaction to occur between the substrate and the film, which serve as electrodes, in order to form electrochemically activated chemical species. This chemical species participates in the film curing reaction and, even in the case of baking at relatively low temperatures, sufficient film curability can be obtained. Such electrodeposition coating composition having electrodeposition potentiality hardly induce the series of curing reactions, including curing initiation and progress of curing, without the passage through the electrodeposition step; therefore, it is stable in the bath without undergoing any modification. Thus, even when the bath temperature and the baking temperature are selected so that the difference therebetween becomes small, the bath stability and film curability can be consistent with each other. The electrodeposition coating process by which the electrodeposition coating composition of the present invention can be applied, namely the electrodeposition coating process of the present invention, comprises the electrodeposition step of immersing a substrate in said electrodeposition coating composition of the present invention and applying a voltage between the substrate as an anode or cathode and a counter electrode to thereby form a film of said electrodeposition coating composition on the surface of the substrate, and the heating step of heating said film obtained in the above electrodeposition step to give a cured film.

When, in the above-mentioned electrodeposition step, the electrodeposition coating composition employed is a cationic electrodeposition coating composition, said substrate is subjected to electrodeposition as a cathode and, when the electrodeposition coating composition employed is an anionic electrodeposition coating composition, said substrate is subjected to electrodeposition as an anode.

Said substrate is not limited to any particular one but includes substrates made of a conductive material, for example surface-treated steel sheets, untreated steel sheets, galvanized steel sheets and other various alloy sheets. Its shape or form is not critical but it may have a simple structure such as a plane sheet, or may have a complicated shape and form.

The concentration of said electrodeposition coating composition is not critical. For satisfactory electrodeposition coating, however, it is preferred that the bath liquid be adjusted so as to have a nonvolatile matter content of 15 to 25%.

The voltage to be applied is not critical. Generally, however, it is determined according to the electric resistance of the film to which said voltage is applied.

Generally, a direct-current voltage of 5 to 500 V, preferably 50 to 350 V, is applied.

The bath temperature on the occasion of voltage application can be selected within the range of 0 to 100° C., since the electrodeposition coating composition to be used is such that the bath stability can be maintained even at high temperatures. When, however, the mechanical stability and heat stability of the electrodeposition coating composition and the reactivity of the curing functional group are taken into consideration, the range of 5 to 50° C. is preferred and a more preferred range is 15 to 35° C.

As regards the treatment time in the electrodeposition step, it is generally preferred that the total voltage application time which is the sum of the time required for increasing the voltage to a specified application voltage and the time during which said specified voltage is maintained amount to 0.5 to 30 minutes. If said time is shorter than 0.5 minute, the formation of the chemical species activated by the electrode reaction is too small in quantity, so that the film hardness can hardly be increased. When said time exceeds 30 minutes, the electric power consumption uneconomically increases. A period of 1 to 10 minutes is more preferred. The substrate coated in the electrodeposition step may be sent to the heating step as it is, or may be sent to the heating step after washing the surface with water to thereby remove unnecessary water-soluble substances therefrom.

Said water washing is preferably performed using pure water. It is preferred that, after washing, the substrate be allowed to stand at room temperature for about 10 minutes.

Said heating step is carried out in a heating oven such as an electric drying or gas-drying oven. The baking of the substrate coated is carried out at 100 to 240° C., preferably 140 to 200° C., for 5 to 60 minutes, preferably 10 to 30 minutes.

In the electrodeposition coating process according to the present invention, the electrodeposition step serves not only as the film deposition step but also as the step for an electron transfer type reaction, which is the first stage of the film curing reaction. The electrodeposition coating composition to be used in the electrodeposition coating process of the present invention possesses electrodeposition potentiality, as mentioned above. Therefore, when a voltage is applied to the electrode in the electrodeposition step, an electrolysis-generated base, an electrolysis-generated acid, and/or a radical is formed and remains existing in the film formed. As a result, the curing reaction can be initiated in the heating step and said curing reaction can be markedly promoted. Therefore, the film can be cured to a satisfactory extent even when the heating temperature is set at a relatively low level in the heating step.

BEST MODES FOR CARRYING OUT THE INVENTION

The following examples illustrate the present invention in further detail but are by no means limitative of the scope of the present invention.

Production Example 1 Amino- and propargyl-containing epoxy type cationic resin (a)

A flask equipped with stirrer, thermometer, nitrogen inlet tube and reflux condenser was charged with 100.0 g of o-cresolnovolak-based epoxy resin with an epoxy equivalent of 200.4 (Epo-Tohto YDCN-701, product of Tohto Kasei), 21.8 g of propargyl alcohol and 0.3 g of dimethylbenzylamine. The temperature was raised to 125° C. and the reaction was conducted for 3 hours, to give a propargyl-containing resin with an epoxy equivalent of 1,200. To this reaction product were further added 43.6 g of ethylene glycol mono-n-hexyl ether and 8.3 g of N-methylaminoethanol, and the reaction was carried out at 115° C. for 3 hours to give the desired resin solution (a). The solid matter concentration was 74.7% by weight.

Production Example 2 Sulfonium- and propargyl-containing epoxy type cationic resin (b)

A flask equipped with stirrer, thermometer, nitrogen inlet tube and reflux condenser was charged with 100.0 g of o-cresolnovolak-based epoxy resin with an epoxy equivalent of 200.4 (Epo-Tohto YDCN-701, product of Tohto Kasei), 30.6 g of propargyl alcohol and 0.3 g of dimethylbenzylamine. The temperature was raised to 125° C. and the reaction was allowed to proceed for 3 hours to give a propargyl-containing resin with an epoxy equivalent of 1,600. A 109.0 g portion of this reaction product was transferred to a flask equipped with stirrer, thermometer, nitrogen inlet tube and reflux condenser, 9.9 g of 1-(2-hydroxyethylthio)-2,3-propanediol, 3.9 g of glacial acetic acid and 6.4 g of deionized water. The temperature was raised to 75° C. and the reaction was allowed to proceed for 6 hours. After it was confirmed that the residual acid value is less than 5, 28.9 g of deionized water was added to give the desired resin solution (b). The solid matter concentration was 70.0% by weight.

Production Example 3 Cationic resin composition (c) curable by the Michael addition reaction Step 1

A flask equipped with stirrer, thermometer, nitrogen inlet tube and reflux condenser was charged with 122.2 g of xylene, 37.6 g of diglycidyl ether-based epoxy resin with an epoxy equivalent of 188 (DER-331J, product of Dow Chemical), 11.4 g of bisphenol A and 0.03 g of 35 dimethylbenzylamine. The flask contents were heated at 165° C. for 3.5 hours, whereby the reaction proceeded to an epoxy equivalent of 490.

To this were added 40.0 g of polyoxyalkylenediamine with an amine equivalent of 200 (Jeffamine D-400, product of Texaco Chemical) and 17.4 g of xylene, and the reaction was carried out by heating the mixture at 125° C. for 5 hours. Thereafter, 15.8 g of dimethylaminopropylacylamide was added, the mixture was heated at 125° C. for 4 hours and then 26.0 g of ethyl acetoacetate was added. The temperature of the mixture was raised to 150° C., and, while the ethanol formed was distilled off out of the system, the reaction was conducted with heating about 3 hours until the distillate amounted to about 90 g, to give the desired, active methylene-containing resin with a solid content of 80.4% by weight.

Step 2

The active methylene-containing resin obtained in step 1 and trimethylolpropane-propylene oxide (6 moles) adduct (Aronix M-320, product of Toagosei Chemical Industry) were combined so that the functional group ratio, namely active methylene/α, β-unsaturated carbonyl group amounted to 1:1. The mixture was stirred at 70t for 30 minutes to render the system homogeneous, to give the desired resin composition (c).

Example 1 Cationic electrodeposition film A

A water-based coating liquid with a solid matter concentration of 50% was once prepared by uniformly admixing tetrabutylammonium bromide with the resin solution (a) obtained in Production Example 1 (the amount of the bromide being 1 g per 100 g of the solids in said resin solution), adding acetic acid in an amount equivalent to 30 mole % of said resin adduct amine and further adding deionized water gradually with sufficient stirring by means of a Disper. Said coating liquid was further diluted by adding pure water to give a water-based paint with a solid matter concentration of 15%. A zinc phosphate-treated cold-rolled steel sheet (JIS G 3141 SPCC-SD, treated with Surfdyne SD-5000, product of Nippon Paint) was immersed in said paint and electrodeposition coating was conducted with said sheet as a cathode and a stainless steel container as an anode.

Figure 1:
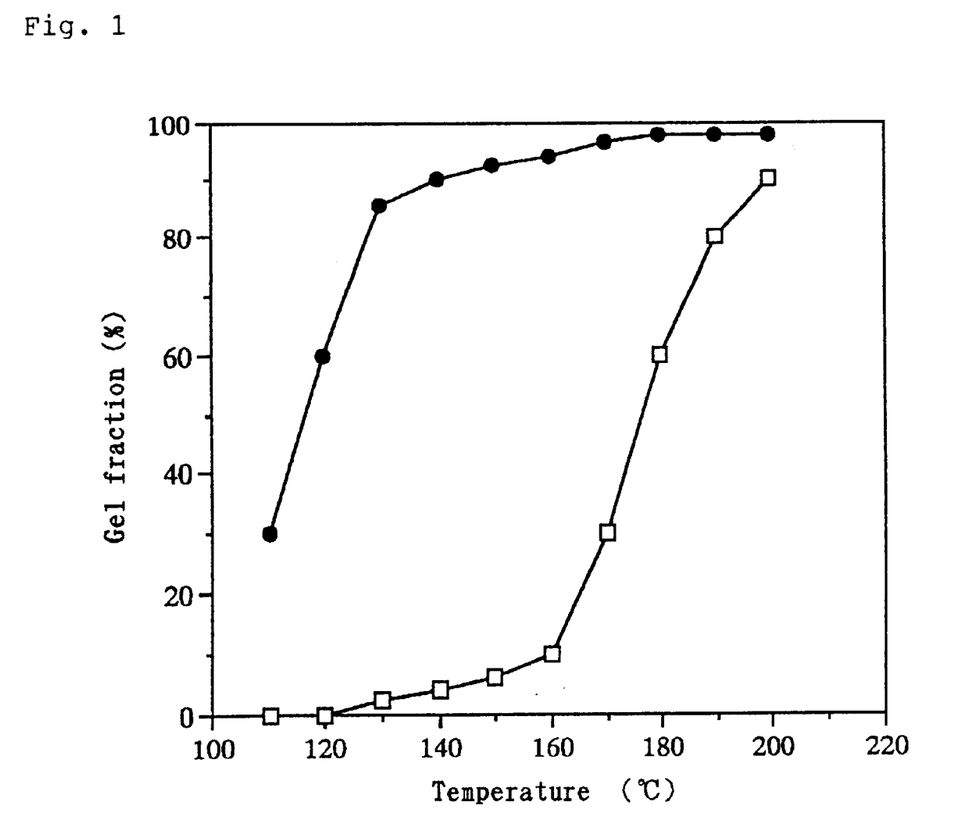
FIG. 1 is a graphic representation of the relationship between gel fraction and baking temperature for the electrodeposition coating composition of Example 1 and of Comparative Example 1. The ordinate indicates the gel fraction (%) and the abscissa indicates the baking temperature (°C). In the figure, ● is for Example 1, and □ for Comparative Example 1.

The coated substrate was taken up from the electrodeposition bath, washed with water and subjected to baking at a specified drying temperature, to give the desired paint film with a dry film thickness of 15 μm. The thus-obtained coated sheet was placed in a Soxhlet extractor and subjected to extraction using a 1:1 mixture of acetone and methanol under refluxing conditions for 6 hours and the gel fraction of the cured film was calculated as follows:

Gel fraction (%)=weight after extraction (g)/
weight before extraction (g)×100

The result is shown in FIG. 1.

Comparative Example 1 Bar coater (nonelectrodeposition) coated film A'

The 50% aqueous coating liquid prepared in Example 1 was applied to a dry film thickness of 15 μm using a bar coater, followed by baking at a specified temperature, to give the desired paint film. For the thus-produced coated sheet, the gel fraction was determined by the same technique as used in Example 1. The result is shown in FIG. 1.

Example 2 Cationic electrodeposition film B

A water-based coating liquid with a solid matter concentration of 50% was once prepared by gradually adding deionized water to the resin solution (b) obtained in Production Example 2 with sufficient stirring with a Disper.

Said coating liquid was further diluted by adding pure water to give a water-based paint with a solid matter concentration of 15%. A zinc phosphate-treated cold-rolled steel sheet (JIS G 3141 SPCC-SD, treated with Surfdyne SD-5000, product of Nippon Paint) was immersed in said paint and electrodeposition coating was conducted with said sheet as a cathode and a stainless steel container as an anode.

Figure 2:
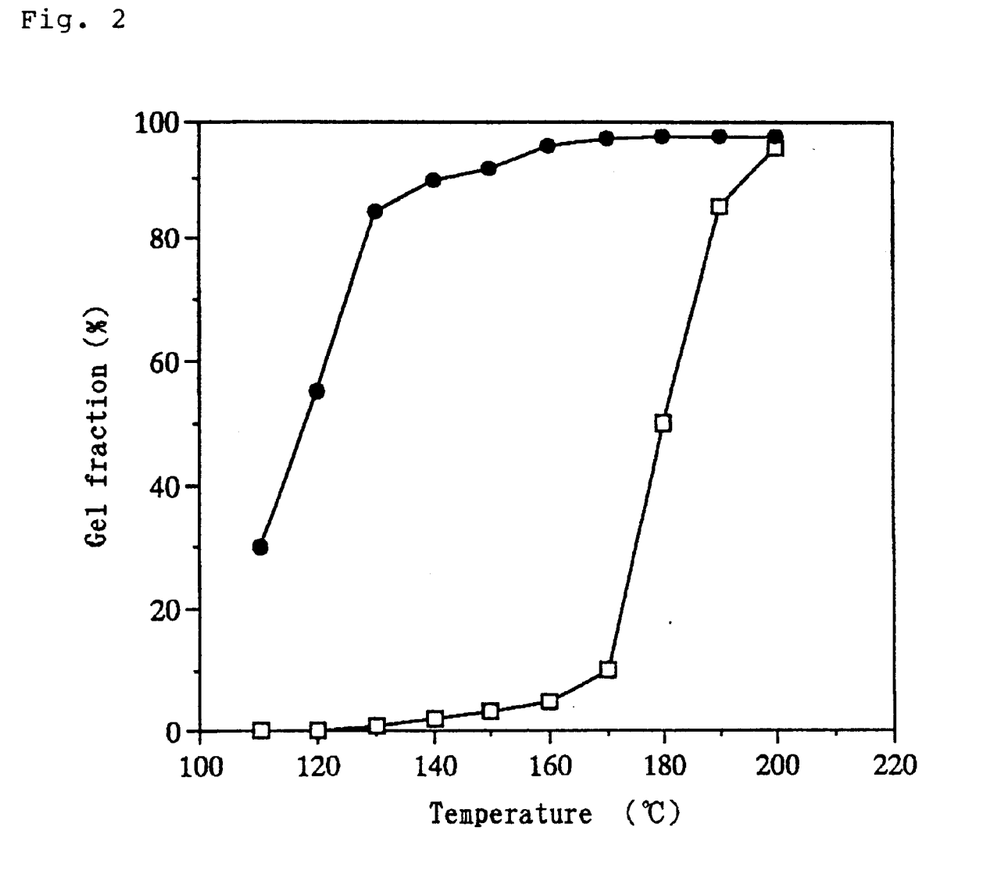
FIG. 2 is a graphic representation of the relationship between gel fraction and baking temperature for the electrodeposition coating composition of Example 2 and of Comparative Example 2. The ordinate indicates the gel fraction (%) and the abscissa indicates the baking temperature (°C.). In the figure, ● is for Example 2, and □ for Comparative Example 2.

The coated substrate was taken up from the electrodeposition bath, washed with water and subjected to baking at a specified drying temperature, to give the desired paint film with a dry film thickness of 15 μm. The thus-obtained coated sheet was evaluated for gel fraction using the same technique as used in Example 1. The result is shown in FIG. 2.

Comparative Example 2 Bar coater (nonelectrodeposition) coated film B'

The 50% aqueous coating liquid prepared in Example 2 was applied to a dry film thickness of 15 μm using a bar coater, followed by baking at a specified temperature, to give the desired paint film. For the thus-produced coated sheet, the gel fraction was determined by the same technique as used in Example 1. The result is shown in FIG. 2.

Example 3 Cationic electrodeposition film C

A water-based coating liquid with a solid matter concentration of 50% was once prepared by uniformly admixing tetrabutylammonium bromide with the resin solution (c) obtained in Production Example 3 (the amount of the bromide being 1 g per 100 g of the solids in said resin solution), adding acetic acid in an amount equivalent to 30 mole % of said resin adduct amine and further adding deionized water gradually with sufficient stirring by means of a Disper.

Said coating liquid was further diluted by adding pure water to give a water-based paint with a solid matter concentration of 15%. A zinc phosphate-treated cold-rolled steel sheet (JIS G 3141 SPCC-SD, treated with Surfdyne SD-5000, product of Nippon Paint) was immersed in said paint and electrodeposition coating was conducted with said sheet as a cathode and a stainless steel container as an anode.

The coated substrate was taken up from the electrodeposition bath, washed with water and subjected to baking at a specified drying temperature, to give the desired paint film with a dry film thickness of 15 μm. The thus-obtained coated sheet was evaluated for gel fraction using the same technique as used in Example 1. The result is shown in FIG. 3.

Comparative Example 3 Bar coater (nonelectrodeposition) coated film C'

The 50% aqueous coating liquid prepared in Example 3 was applied to a dry film thickness of 15 μm using a bar coater, followed by baking at a specified temperature, to give the desired paint film. For the thus-produced coated sheet, the gel fraction was determined by the same technique as used in Example 1. The result is shown in FIG. 3.

Figure 3:
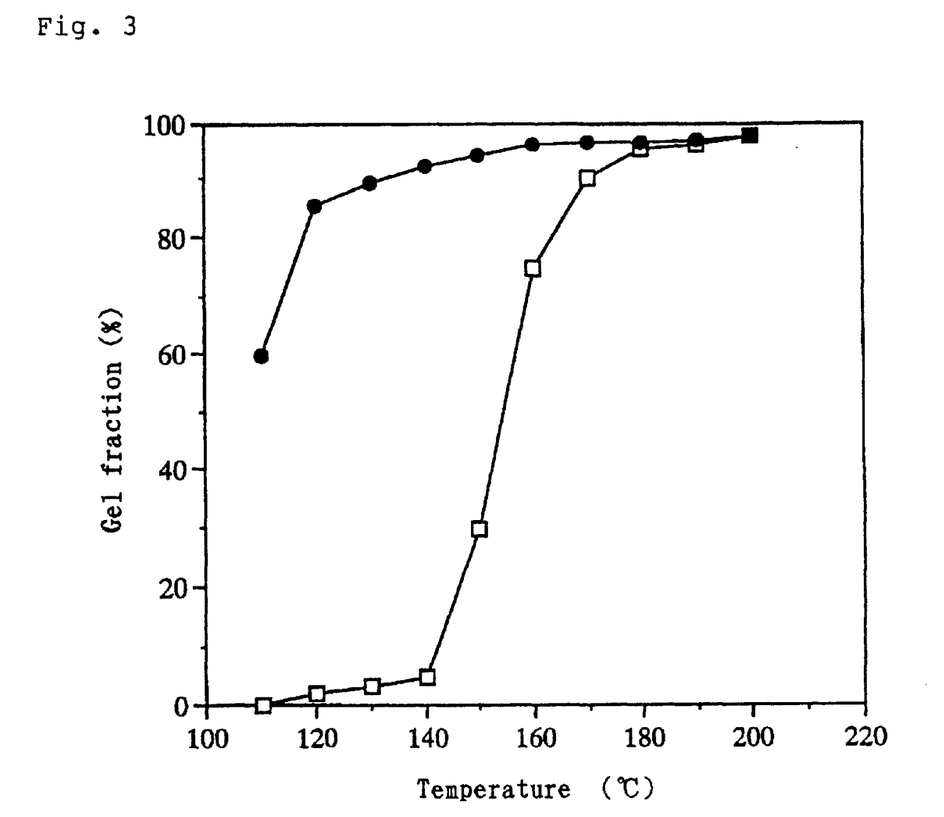
FIG. 3 is a graphic representation of the relationship between gel fraction and baking temperature for the electrodeposition coating composition of Example 3 and of Comparative Example 3. The ordinate indicates the gel fraction (%) and the abscissa indicates the baking temperature (°C.). In the figure, ● is for Example 3, and □ for Comparative Example 3.

As is evident from FIGS. 1 to 3, a sufficient level of hardness could be obtained in Examples 1 to 3 even by low-temperature baking, since the electrodeposition coating compositions having electrodeposition potentiality were used there and they passed through electrodeposition step. On the other hand, in Comparative Examples 1 to 3, in which the electrodeposition coating compositions having electrodeposition potentiality were used but did not pass through any electrodeposition step, no satisfactory hardness could be obtained; for obtaining hardness, very high temperatures were required for baking, which was very disadvantageous from the energy viewpoint.

Production Example 4 Hydrophobic resin having a bulky alkoxysilyl group in its side chain Xylene (27 parts by weight) was heated to 70° C. Thereto was added dropwise a mixture of 80 parts by weight of vinyltriisopropoxysilane, 80 parts by weight of vinyl acetate and 16 parts by weight of t-butyl peroxypivalate over 3 hours. Then, a mixture of 2.3 parts by weight of t-butyl peroxypivalate and 13 parts by weight of xylene was further added dropwise over 30 minutes. Thereafter, the reaction was continued for 4 hours while maintaining the same temperature, to give a resin having the corresponding alkoxysilyl group in its side chain.

Production Example 5 Hydrophilic acrylic resin having a carboxyl group in its side chain Isopropyl alcohol (67 parts by weight) was heated to 70° C., and thereto was added dropwise a mixture of 25 parts by weight of methyl methacrylate, 21 parts by weight of styrene, 22 parts by weight of n-butyl acrylate, 20 parts by weight of 2-hydroxyethyl methacrylate, 7 parts by weight of acrylic acid and 1 part by weight of azobisisobutyronitrile over 3 hours. Then, a mixture of 0.5 part by weight of azobisisobutyronitrile and 13 parts by weight of n-butanol was further added dropwise over 30 minutes. Thereafter, the reaction was continued for 4 hours while maintaining the same temperature, to give a hydrophilic acrylic resin (acid value: 54 mg KOH/solids) having a carboxyl group in its side chain.

Example 4 Anionic electrodeposition film

The side chain alkoxysilyl-containing resin obtained in Production Example 4 (69 parts by weight), 95 parts by weight of the side chain carboxyl-containing hydrophilic acrylic resin obtained in Production Example 5 and 4 parts by weight of triethylamine were mixed together. Thereto was added 831 parts by weight of pure water with stirring, to give an anionic electrodeposition coating composition with a solid content of 10%. An anodically oxidized aluminum sheet was subjected to anionic electrodeposition coating using said electrodeposition paint, with the aluminum sheet as an anode and a stainless steel sheet as a cathode, at a painting voltage of 100 V, 160 V or 220 V to a dry film thickness of 10 μm. After completion of electrodeposition, each film obtained was washed with water and heated at 180° C. for 30 minutes. The respective cured films were evaluated for surface luster at 60 degrees. The results were as follows: 100 when the painting voltage was loo V, 37 when said voltage was 160 V, and 40 when said voltage was 220 V.

From the above results, it was confirmed that matte paint films resulting from hydrolysis of the alkoxysilane by the electrolysis-generated acid and the succeeding condensation of silanol groups cannot be obtained at low voltage levels but that matte paint films can be obtained at 160 V and above.

INDUSTRIAL APPLICABILITY

The electrodeposition coating composition of the present invention, which has the above-mentioned constitution, has good bath stability and can provide films with good curability, hence can provide good corrosion resistance. Therefore, said composition is suited for use in undercoating of shaped metal articles. The electrodeposition coating process of the present invention, which is as mentioned above, can attain good coating results using the electrodeposition coating composition of the present invention.

What is claimed is:

1. An electrodeposition coating process which comprises a) immersing a substrate in an electrodeposition coating composition and applying a voltage between the substrate as an anode or cathode and a counter electrode to thereby form a film of said electrodeposition coating composition on the surface of the substrate, and b) heating said film obtained in a) above, and wherein said electrodeposition coating composition has electrodepositian potentiality against the curing reaction of said film, and contains a functional group capable of generating an activated chemical species in an electrode reaction as induced by applying said voltage in a) above, said activated chemical species is involved in the curing reaction of the film, and a curing system capable of progressing the curing reaction by the action of said activated chemical species, and wherein said curing system is a propargyl/allene curing system in which propargyl group is denatured to allene bond by an electrolysis generated base.

2. The electrodeposition process according to claim 1, wherein the primary factor in said electrodeposition potentiality is that the chemical species activated by electrode reaction as induced by applying said voltage in a) is formed in the film and said activated chemical species is involved in the curing reaction of said film.

3. The electrodeposition coating process according to claim 2, wherein said chemical species activated by said electrode reaction is at least one chemical species selected from the group consisting of electrolysis-generated bases, electrolysis-generated acids and radicals.

4. The electrodeposition coating process according to claim 1, wherein said functional group is an onium group.

5. The electrodeposition coating process according to claim 4, wherein said onium group is an ammonium group, a sulfonium group or a phosphonium group.

6. The electrodeposition coating process according to claim 4, wherein said onium group is contained in a resin component.

7. The electrodeposition coating process according to claim 4, wherein said onium group is contained in a component other than a resin component.

8. The electrodeposition coating process according to claim 1, wherein said heating step is carried our at 100 to 240° C. for 5 to 60 minutes.

9. The electrodeposition coating process according to claim 2, wherein said heating step is carried out at 100 to 240° C. for 5 to 60 minutes.

10. The electrodeposition coating process according to claim 3, wherein said heating step is carried out at 100 to 240° C. for 5 to 60 minutes.

11. The electrodeposition coating process according to claim 4, wherein said heating step is carried out at 100 to 240° C. for 5 to 60 minutes.

12. The electrodeposition coating process according to claim 5, wherein said heating step is carried out at 100 to 240° C. for 5 to 60 minutes.

* * * * *

UNITED STATES PATENT AND TRADEMARK OFFICE
CERTIFICATE OF CORRECTION

PATENT NO.   : 6,641,711 B2
DATED        : November 4, 2003
INVENTOR(S)  : Hiroyuki Sakamoto et al.

It is certified that error appears in the above-identified patent and that said Letters Patent is hereby corrected as shown below:

Column 14,
Line 42, replace the word "electrodepositian" with -- electrodeposition" --.

Column 15,
Line 8, replace the word "our" with -- out --.

Signed and Sealed this

Sixth Day of July, 2004

JON W. DUDAS
*Acting Director of the United States Patent and Trademark Office*